United States Patent
Chiang

(10) Patent No.: US 11,459,042 B2
(45) Date of Patent: Oct. 4, 2022

(54) TRACK SHOE PAD ASSEMBLY AND INSERT ELEMENT STRUCTURE OF TRACK RUBBER PAD

(71) Applicant: EVERPADS CO., LTD., Taichung (TW)

(72) Inventor: Chun-Li Chiang, Taichung (TW)

(73) Assignee: EVERPADS CO., LTD., Taichung (TW)

( * ) Notice: Subject to any disclaimer, the term of this patent is extended or adjusted under 35 U.S.C. 154(b) by 363 days.

(21) Appl. No.: 16/675,194

(22) Filed: Nov. 5, 2019

(65) Prior Publication Data

US 2020/0307726 A1    Oct. 1, 2020

(30) Foreign Application Priority Data

Mar. 29, 2019 (TW) .................................. 108203943

(51) Int. Cl.
*B62D 55/28* (2006.01)
*B62D 55/275* (2006.01)

(52) U.S. Cl.
CPC ........... *B62D 55/28* (2013.01); *B62D 55/275* (2013.01)

(58) Field of Classification Search
CPC ............................. B62D 55/275; B62D 55/28
See application file for complete search history.

(56) References Cited

U.S. PATENT DOCUMENTS

| | | | |
|---|---|---|---|
| 7,731,306 B2* | 6/2010 | Busley | B62D 55/275 305/189 |
| 8,011,739 B2* | 9/2011 | Busley | B62D 55/275 305/189 |
| 10,308,298 B2* | 6/2019 | Chiang | B62D 55/26 |
| 2020/0086936 A1* | 3/2020 | Gallagher | B62D 55/28 |

* cited by examiner

*Primary Examiner* — Jason R Bellinger
(74) *Attorney, Agent, or Firm* — CKC & Partners Co., LLC

(57) ABSTRACT

An insert element structure of a track rubber pad, which is connected to a track shoe plate of a caterpillar vehicle by at least one screw member, the insert element structure of the track rubber pad includes a rubber pad, at least one insert element, and at least two fasteners. The rubber pad is detachably connected to the track shoe plate. Each of two ends of the at least one insert element includes at least one hole, wherein the at least one insert element is cladded in the at least one projection of the rubber pad. Each of the at least two fasteners is passed through and disposed in each of the holes of the at least one insert element, wherein each of the at least two fasteners includes an abutting portion, an opening portion and a threaded portion.

17 Claims, 7 Drawing Sheets

TRACK SHOE PAD ASSEMBLY AND INSERT ELEMENT STRUCTURE OF TRACK RUBBER PAD

RELATED APPLICATIONS

This application claims priority to Taiwan Application Serial Number 108203943, filed Mar. 29, 2019, which is herein incorporated by reference.

BACKGROUND

Technical Field

The present disclosure relates to a track shoe pad assembly and an insert element structure of a track rubber pad. More particularly, the present disclosure relates to a track shoe pad assembly and an insert element structure of a track rubber pad applied to a caterpillar vehicle.

Description of Related Art

Today, the tracks are applied to the caterpillar vehicles extensively, such as excavators, pavement machines, cement or asphalt pavers. In order to avoid the metal track chain directly contacting the pavement to generate the huge noise or damage the pavement, a track shoe pad assembly is disposed on the outside of the track chain, so as to protect the pavement and reduce the noise.

The conventional track shoe pad assembly includes a track shoe plate, an insert element and a rubber pad. When the track shoe pad assembly is stably assembled on the track chain, the rubber pad is elastic and can provide the function of shock absorption. The insert element is assembled on the rubber pad to increase the strength of the rubber pad. Finally, the track shoe plate, the rubber pad and the insert element are fixed to the track chain by the screw member, so as to avoid the track chain directly contacting the pavement.

However, the rubber pad should be replaced because of the long-term abrasion. A heavy vehicle (such as a heavy paver) moved by the track chain will continuously replace in seriatim or the same time due to the hundreds of track shoe pad assembly are installed on the track chain simultaneously, so that will significantly affect the cost of repair, replacement and manufacturing. At present, the industry has improved the connection method of the track shoe plate, the rubber pad and the insert element, and designed them as a detachable structure, which is not necessary to eliminate the whole track shoe pad assembly. But in the process of manufacturing the rubber pad, it is necessary to manufacture many kinds of different sizes of the rubber pad due to the different size of the screw member, so that will increase the manufacturing cost.

Therefore, how to improve the structural configuration and connection method of the insert element and the rubber pad, so as to strengthen the track shoe pad assembly structure and reduce the cost is the goal of the relevant industry.

SUMMARY

According to one aspect of the present disclosure, an insert element structure of a track rubber pad is provided. The insert element structure of the track rubber pad is connected to a track shoe plate of a caterpillar vehicle by at least one screw member, wherein the insert element structure of the track rubber pad includes a rubber pad, at least one insert element, and at least two fasteners. The rubber pad is detachably connected to the track shoe plate, wherein one side of the rubber pad includes at least one projection, and each of two ends of the at least one projection include at least one cavity. Each of two ends of the at least one insert element include at least one hole, wherein the at least one insert element is cladded in the at least one projection of the rubber pad, and each of the holes of the at least one insert element is coaxially disposed with each of the cavities of the at least one projection. Each of the at least two fasteners is passed through and disposed in each of the holes of the at least one insert element, wherein each of the at least two fasteners includes an abutting portion, an opening portion and a threaded portion. The abutting portion is disposed on one side of each of the at least two fasteners, and located between the at least one insert element and the rubber pad. The opening portion is disposed on the other side of each of the at least two fasteners, and corresponding to each of the holes of the at least one insert element. The threaded portion is disposed on an inner wall of each of the at least two fasteners for locking the at least one screw member.

According to another aspect of the present disclosure, a track shoe pad assembly is provided. The track shoe pad assembly is locked and connected to a track chain of a caterpillar vehicle, and includes a track shoe plate and an insert element structure of a track rubber pad. The track shoe plate is configured to lock and connect to the track chain, wherein the track shoe plate includes at least one notch and at least two first through holes, each of the at least two first through holes is passed through and disposed on the at least one notch. The insert element structure of the track rubber pad is connected with the track shoe plate, and the insert element structure of the track rubber pad includes a rubber pad, at least one insert element and at least two fasteners. The rubber pad is detachably connected to the track shoe plate, one side of the rubber pad includes at least one projection, the at least one projection is correspondingly embedded to the at least one notch, and each of two ends of the at least one projection include at least one cavity. Each of two ends of the at least one insert element include at least one hole, the at least one insert element is cladded in the at least one projection of the rubber pad, and each of the holes of the at least one insert element is coaxially disposed with each of the cavities of the at least one projection, and corresponding to each of the at least two first through holes. Each of the at least two fasteners is passed through and disposed in each of the holes of the at least one insert element, and each of the at least two fasteners includes an abutting portion, an opening portion and a threaded portion. The abutting portion is disposed on one side of each of the at least two fasteners, and located between the at least one insert element and the rubber pad. The opening portion is disposed on the other side of each of the at least two fasteners, and corresponding to each of the holes of the at least one insert element. The threaded portion is disposed on an inner wall of each of the at least two fasteners.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
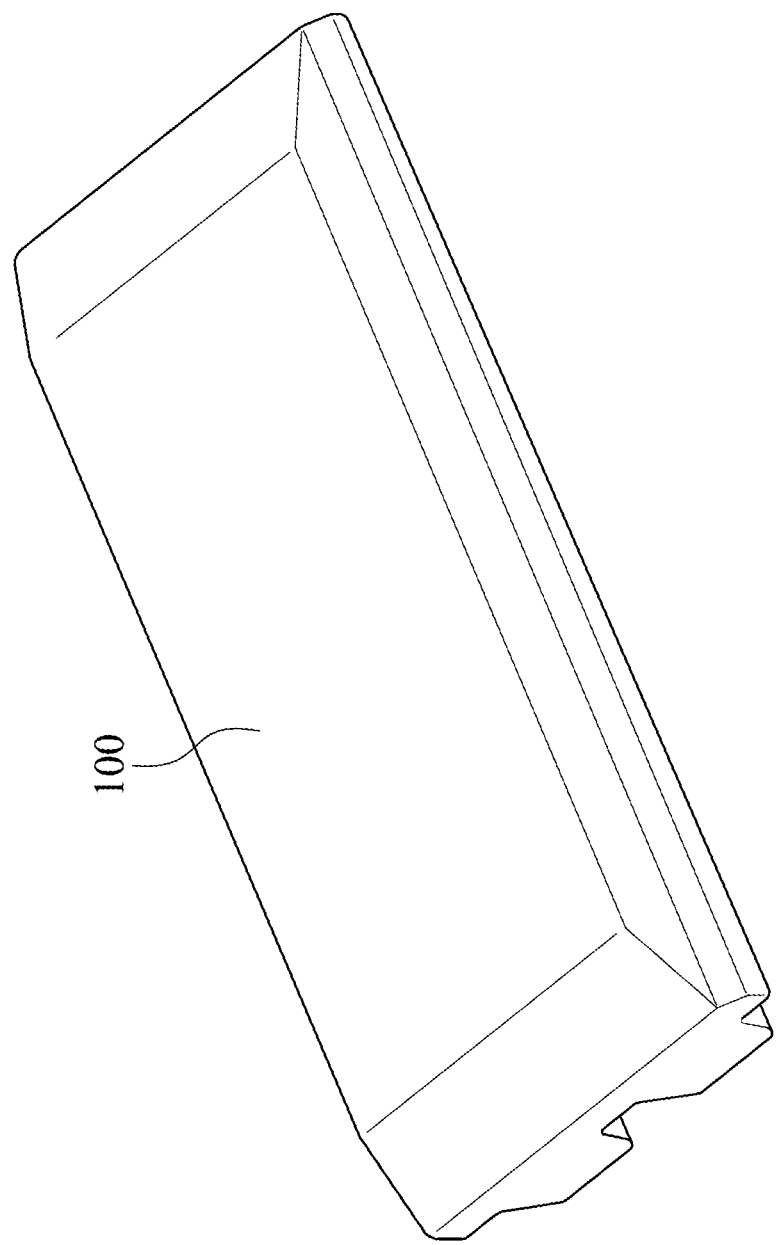
FIG. 1 is a three-dimensional schematic view of an insert element structure of a track rubber pad according to one embodiment of the present disclosure.
Figure 2:
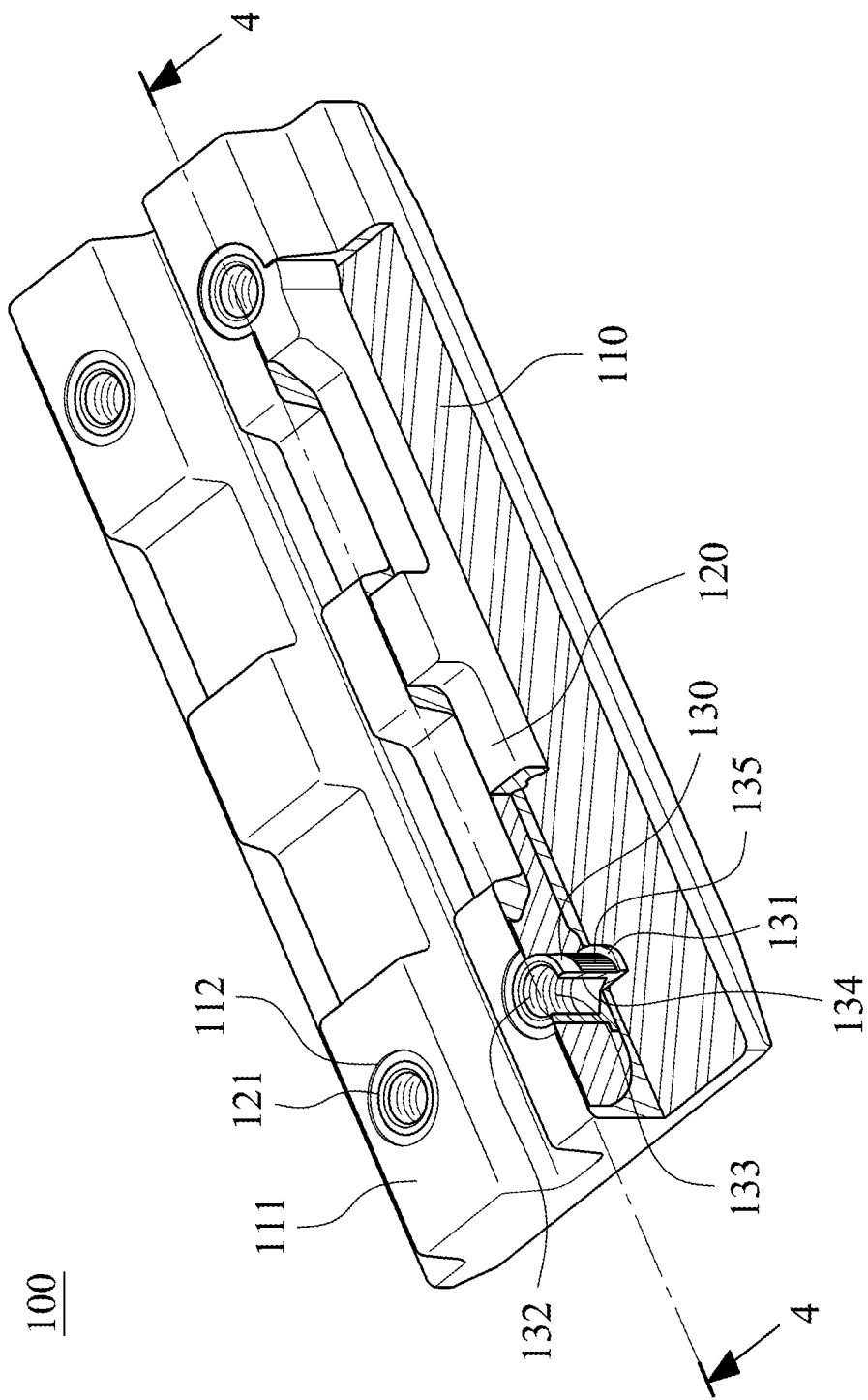
FIG. 2 is a partial cross-sectional view of the insert element structure of the track rubber pad as shown in FIG. 1.
Figure 3:
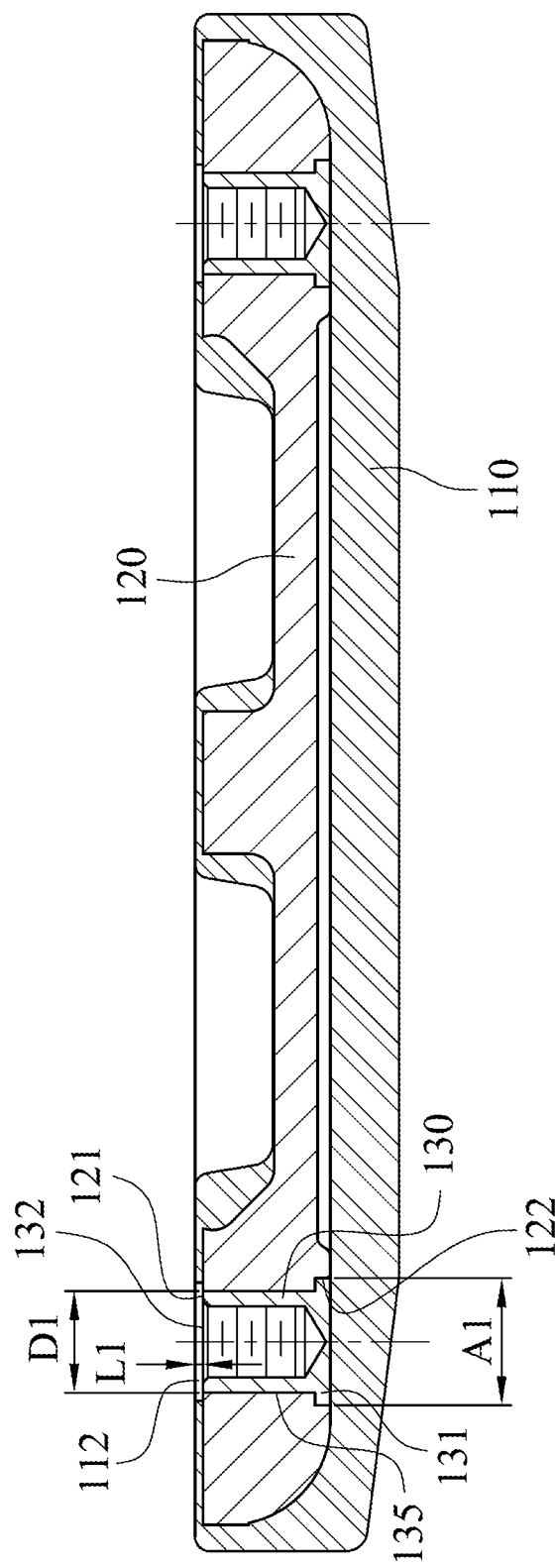
FIG. 3 is a cross-sectional view of the insert element structure of the track rubber pad along line 4-4 as shown in FIG. 2.

Please refer to FIG. 1, FIG. 2 and FIG. 3. FIG. 1 is a three-dimensional schematic view of an insert element structure of a track rubber pad 100 according to one embodiment of the present disclosure. FIG. 2 is a partial cross-sectional view of the insert element structure of the track rubber pad 100 as shown in FIG. 1. FIG. 3 is a cross-sectional view of the insert element structure of the track rubber pad 100 along line 4-4 as shown in FIG. 2. As known in FIG. 1, FIG. 2 and FIG. 3, the insert element structure of the track rubber pad 100 includes a rubber pad 110, at least one insert element 120 and at least two fasteners 130. The insert element structure of the track rubber pad 100 is connected to a track shoe plate (not shown) of a caterpillar vehicle (not shown) by at least one screw member (not shown).

Specifically, the rubber pad 110 is detachably connected to the track shoe plate. One side of the rubber pad 110 includes at least one projection 111, and each of two ends of the projection 111 includes at least one cavity 112. Each of two ends of the insert element 120 includes at least one hole 121. The insert element 120 is cladded in the projection 111 of the rubber pad 110, and each of the holes 121 is coaxially disposed with each of the cavities 112. Each of the fasteners 130 is passed through and disposed in each of the holes 121, and each of the fasteners 130 includes an abutting portion 131, an opening portion 132 and a threaded portion 133. The abutting portion 131 is disposed on one side of the fastener 130, and located between the insert element 120 and the rubber pad 110. The opening portion 132 is disposed on the other side of the fastener 130, and corresponding to the hole 121. The threaded portion 133 is disposed on an inner wall 134 of the fastener 130, and the threaded portion 133 is for locking the screw member. Therefore, when the insert element 120, the fastener 130 and the rubber pad 110 are connected to each other, the support stability of the insert element structure of the track rubber pad 100 is improved so as to prevent the rubber pad 110 from swaying laterally during the operation to increase the loss. Furthermore, due to the setting of the fastener 130, the screw member can be locked to the threaded portion 133 of the fastener 130 instead of the hole 121 of the insert element 120, so that the insert element 120 of the same specification can be cooperated with the screw member of different specification to connect with the track shoe plate to reduce the manufacturing cost of the insert element 120.

In the embodiment of FIG. 2 and FIG. 3, the material of the rubber pad 110 can be rubber or other elastic materials. In the process, first, each of the fasteners 130 is passed through and disposed in each of the holes 121 of the insert element 120. Next, the insert element 120 is disposed on a prefabricated mold (not shown). Then, the rubber pad 110 in a molten condition is injected into the prefabricated mold to contact with the insert element 120. When the rubber pad 110 is solidified, the insert element 120 can be cladded in the rubber pad 110 to form the insert element structure of the track rubber pad 100.

Figure 4:
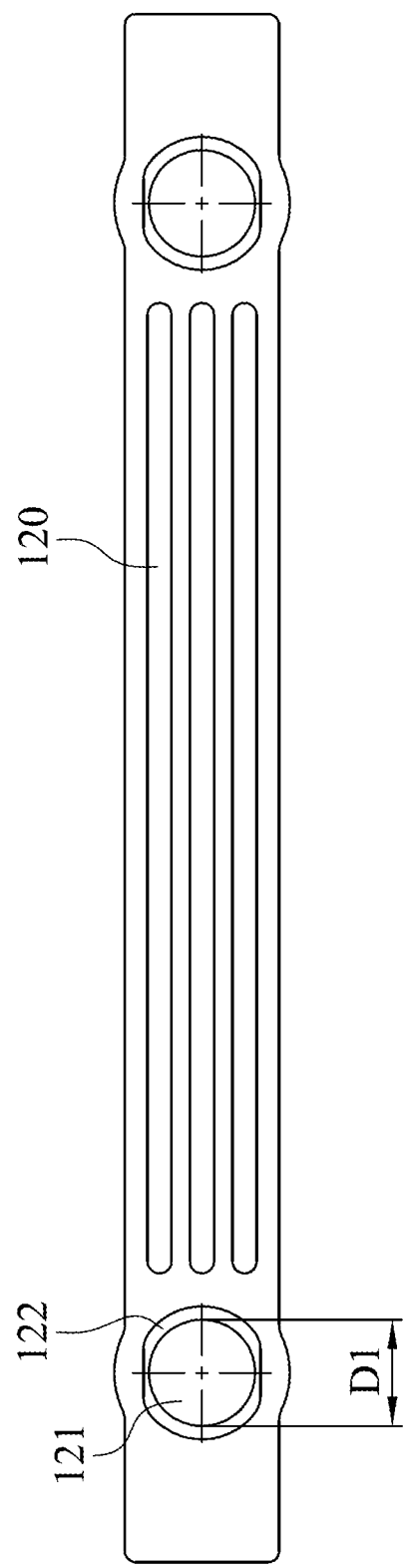
FIG. 4 is a bottom view of the insert element of the insert element structure of the track rubber pad as shown in FIG. 3.

Please refer to FIG. 4, which is a bottom view of the insert element 120 of the insert element structure of the track rubber pad 100 as shown in FIG. 3. As known in FIG. 3 and FIG. 4, a distance L1 (specifically, L1 is the distance between the opening end of the hole 121 and the opening end of the cavity 112 along the axial direction of the cavity 112) is disposed between each of the holes 121 of the insert element 120 and each of the cavities 112 of the rubber pad 110. A maximum outer diameter A1 of the abutting portion 131 of each of the fasteners 130 is greater than a hole diameter D1 of each of the holes 121. Furthermore, the insert element 120 can further include at least two grooves 122. Each of the grooves 122 is located between the insert element 120 and the rubber pad 110, and corresponding to each of the holes 121 for accommodating the abutting portion 131 of each of the fasteners 130. Then, each of the fasteners 130 can be directly passed through and disposed in each of the holes 121, and the abutting portion 131 can be accommodated in each of the grooves 122 to abut the insert element 120 to provide a firm mounting and support. Furthermore, an outer wall 135 of each of the fasteners 130 has an embossing for generating the frictional force to increase the joint strength between each of the fasteners 130 and each of the holes 121. As known in FIG. 2, FIG. 3 and FIG. 4, the number of each of the projection 111 and the insert element 120 is two, and the number of each of the cavity 112, the hole 121, the groove 122 and the fastener 130 is four. The number of the above elements is not limited to the disclosure.

The insert element 120 is made of a metal material and has a certain rigidity to increase the strength of the insert element structure of the track rubber pad 100. Furthermore, each of the holes 121 of the insert element 120 is penetrated by the fastener 130, so that the screw member can be locked to the threaded portion 133 of the fastener 130. Wherein, an inner diameter of the opening portion 132 of the fastener 130 is not limited to the disclosure, and the fastener 130 of different inner diameters can be provided with the screw member of different specification. Therefore, the insert element 120 of the same specification can be cooperated with the screw member of different specification to connect with the track shoe plate to reduce the manufacturing cost of the insert element 120, so as to facilitate for mass production.

Figure 5:
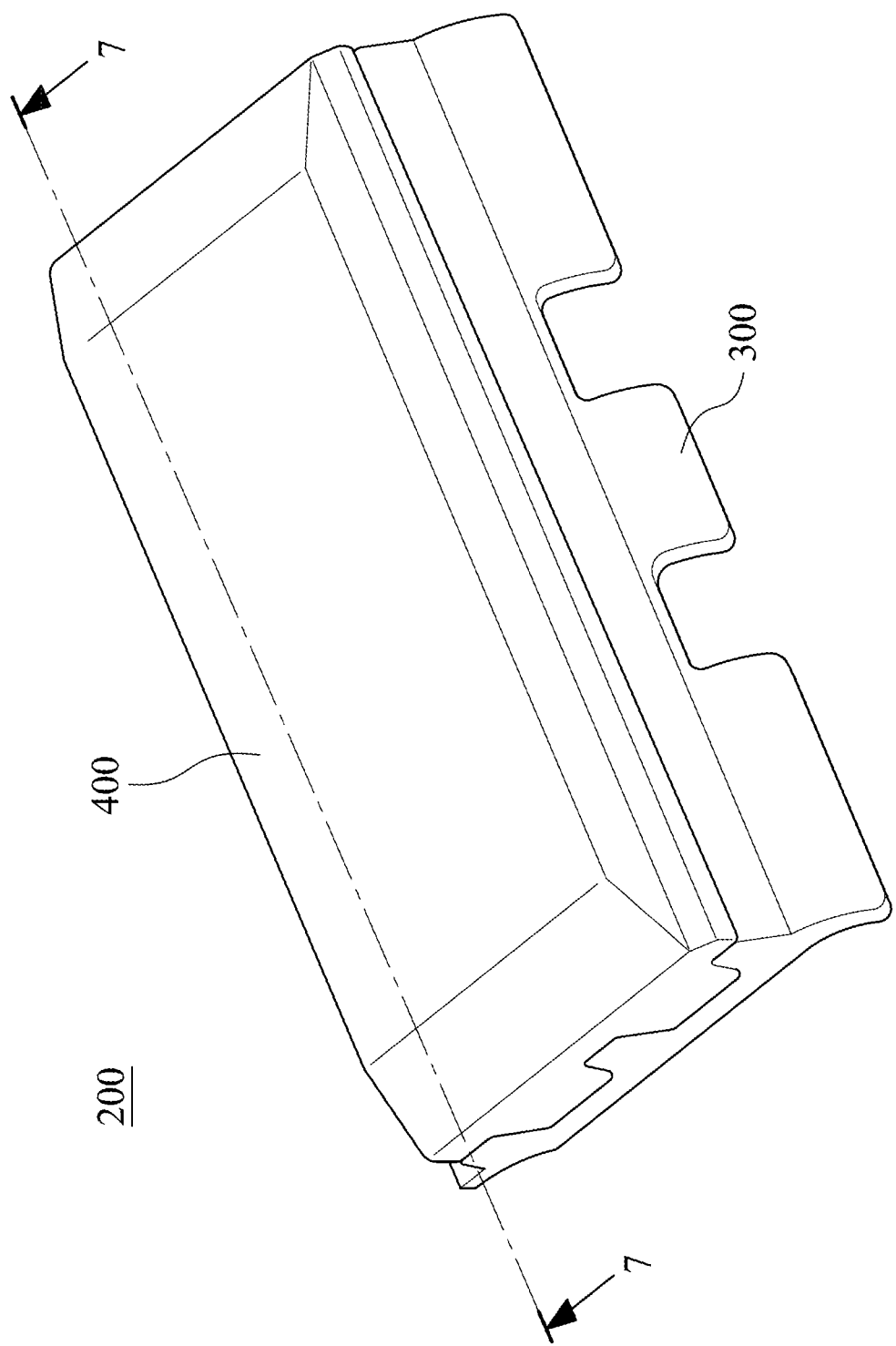
FIG. 5 is a three-dimensional schematic view of a track shoe pad assembly according to another embodiment of the present disclosure.
Figure 6:
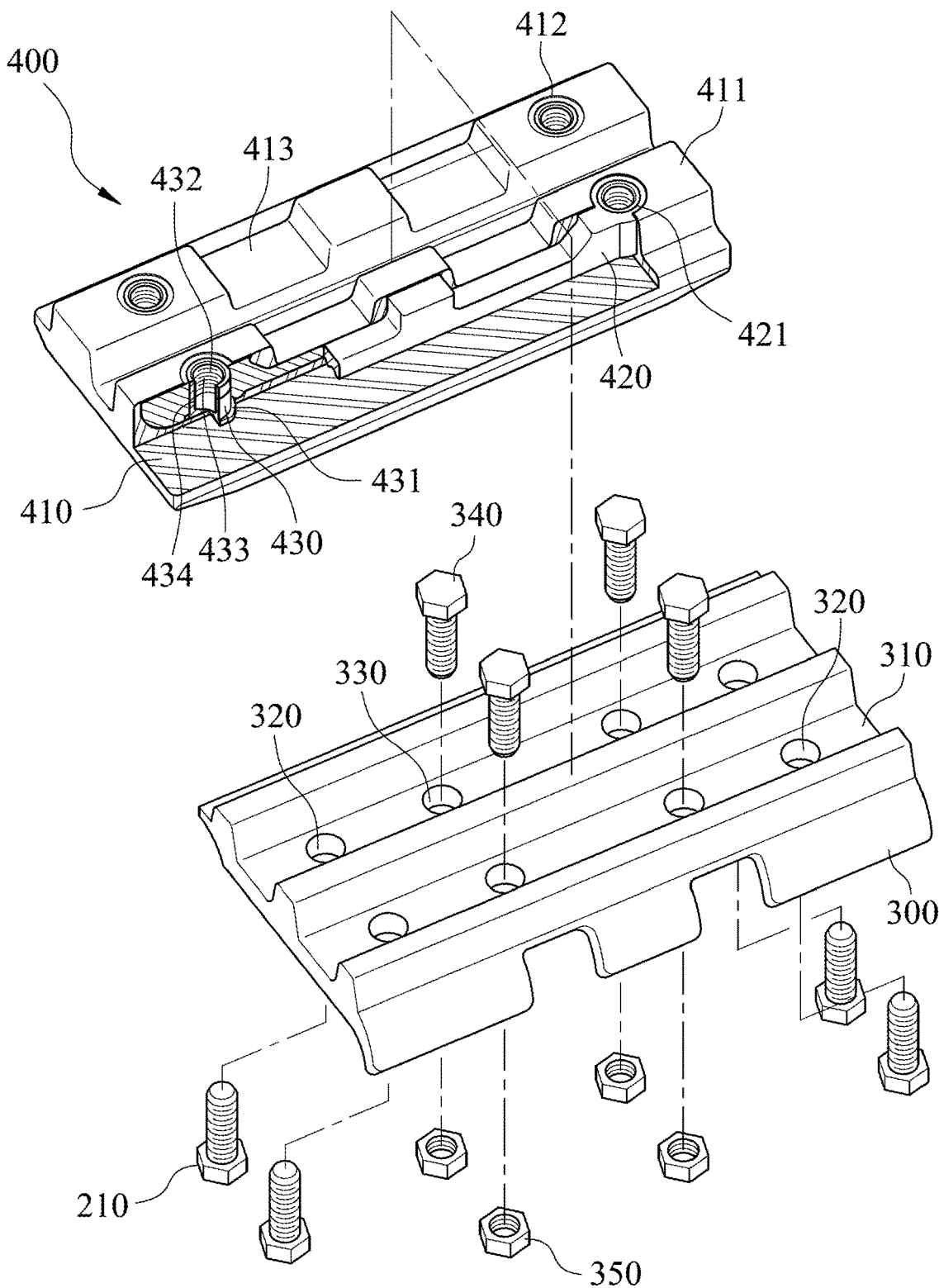
FIG. 6 is an exploded view of the track shoe pad assembly as shown in FIG. 5.
Figure 7:
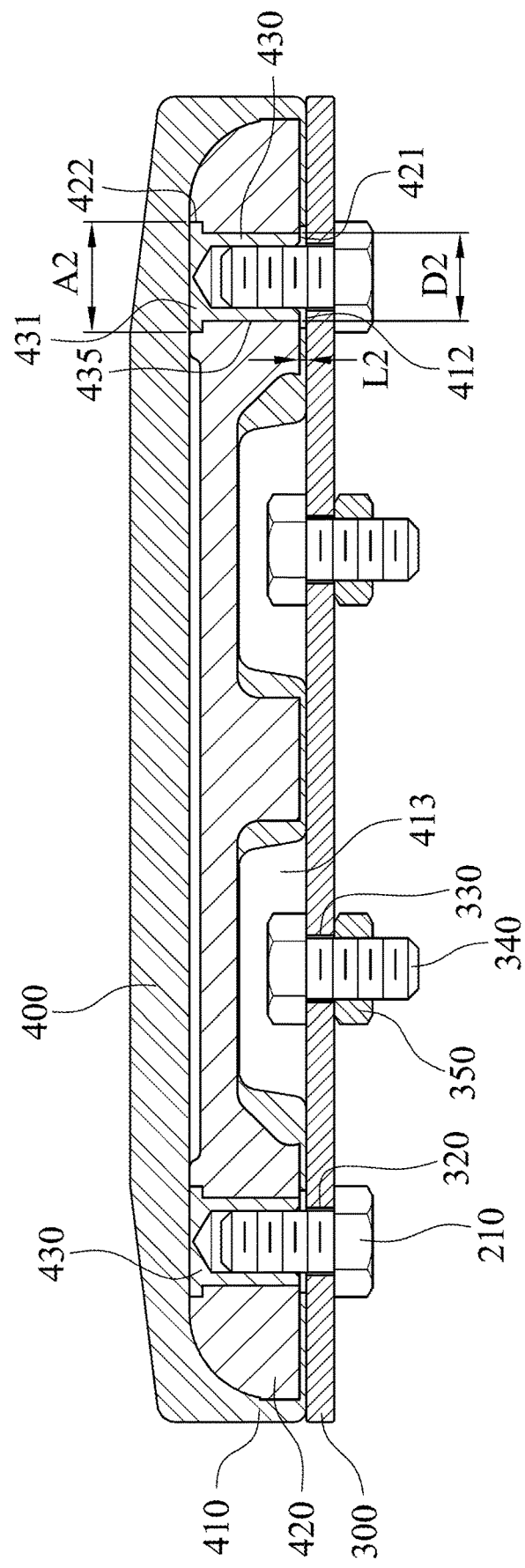
FIG. 7 is a cross-sectional view of the track shoe pad assembly along line 7-7 as shown in FIG. 5.

Please refer to FIG. 5, FIG. 6 and FIG. 7. FIG. 5 is a three-dimensional schematic view of a track shoe pad assembly 200 according to another embodiment of the present disclosure. FIG. 6 is an exploded view of the track shoe pad assembly 200 as shown in FIG. 5. FIG. 7 is a cross-sectional view of the track shoe pad assembly 200 along line 7-7 as shown in FIG. 5. As known in FIG. 5, FIG. 6 and FIG. 7, the track shoe pad assembly 200 includes a track shoe plate 300 and an insert element structure of a track rubber pad 400. The track shoe pad assembly 200 is locked on a track chain (not shown) of a caterpillar vehicle (not shown).

Specifically, the track shoe plate 300 is configured to lock and connect to the track chain, and the track shoe plate 300 includes at least one notch 310 and at least two first through holes 320. Each of the first through holes 320 is passed through and disposed on the notch 310. The insert element structure of the track rubber pad 400 is connected with the track shoe plate 300. The insert element structure of the track rubber pad 400 includes a rubber pad 410, at least one insert element 420 and at least two fasteners 430. The rubber pad 410 is detachably connected to the track shoe plate 300. One side of the rubber pad 410 includes at least one projection 411, the projection 411 is correspondingly embedded to the notch 310 of the track shoe plate 300. Each of two ends of the projection 411 includes at least one cavity 412. Each of two ends of the insert element 420 includes at least one hole 421. The insert element 420 is cladded in the projection 411 of the rubber pad 410. Each of the holes 421 is coaxially disposed with each of the cavities 412 and corresponding to each of the first through holes 320. Each of the fasteners 430 is passed through and disposed in each of the holes 421, and each of the fasteners 430 includes an abutting portion 431, an opening portion 432 and a threaded portion 433. The abutting portion 431 is disposed on one side of the fastener 430, and located between the insert element 420 and the rubber pad 410. The opening portion 432 is disposed on the other side of the fastener 430, and corresponding to the hole 421. The threaded portion 433 is disposed on an inner wall 434 of the fastener 430. Therefore, through the detachable combination between the track shoe plate 300 and the insert element structure of the track rubber pad 400, when the insert element structure of the track rubber pad 400 is replaced, it is not necessary to replace the track shoe plate 300 together to reduce the replacement cost.

In the embodiment of FIG. 6 and FIG. 7, the track shoe plate 300 can be made of a high strength material, such as the metal. Furthermore, the track shoe pad assembly 200 can further include at least two screw members 210, each of the screw members 210 is correspondingly passed through each of the first through holes 320 and locked to the threaded portion 433 of each of the fasteners 430, so that the track shoe plate 300 and the insert element structure of the track rubber pad 400 are interconnected. The aforementioned screw member 210, the first through hole 320 and the fastener 430 are corresponding to each other and are coaxial. As known in FIG. 6, the number of the notch 310 is two, and the number of each of the first through hole 320, the screw member 210 and the fastener 430 is four. The number of the above elements is not limited to the disclosure.

The track shoe plate 300 can further include at least one second through hole 330, and the second through hole 330 is passed through and disposed on the notch 310. Furthermore, the track shoe pad assembly 200 can further include at least one connecting member 340, and the connecting member 340 is correspondingly passed through the second through hole 330 and configured to connect to the track chain. The connecting member 340 is a screw stem.

The material of the rubber pad 410 can be rubber or other elastic materials. In the process, first, each of the fasteners 430 is passed through and disposed in each of the holes 421 of the insert element 420. Next, the insert element 420 is disposed on a prefabricated mold (not shown). Then, the rubber pad 410 in a molten condition is injected into the prefabricated mold to contact with the insert element 420. When the rubber pad 410 is solidified, the insert element 420 can be cladded in the rubber pad 410. Furthermore, the rubber pad 410 can further include at least one recess 413, and the recess 413 is for containing the connecting member 340 of the second through hole 330 correspondingly. Therefore, the insert element structure of the track rubber pad 400 and the track shoe plate 300 can be connected closely to avoid the later sway during the operation. The aforementioned connecting member 340, the second through hole 330 and the recess 413 are corresponding to each other and are coaxial. More specifically, when the track shoe pad assembly 200 is assembled to the track chain, first, each of the connecting members 340 is passed through each of the second through holes 330 of the track shoe plate 300 and the track chain. Then, the connecting member 340 is locked with at least one nut 350 to connect the track shoe plate 300 and the track chain. As known in FIG. 6, the number of each of the second through hole 330, the connecting member 340, the nut 350 and the recess 413 is four. The number of the above elements is not limited to the disclosure.

The rubber pad 410, the insert element 420 and the fastener 430 are combined with each other as described above. At this time, each of the screw members 210 is passed through each of the first through holes 320 of the track shoe plate 300, and then locked to each of the fasteners 430. The insert element structure of the track rubber pad 400 can be connected with the track shoe plate 300 to form the track shoe pad assembly 200 connected to the track chain.

Furthermore, as known in FIG. 7, a distance L2 (specifically, L2 is the distance between the opening end of the hole 421 and the opening end of the cavity 412 along the axial direction of the cavity 412) is disposed between each of the holes 421 of the insert element 420 and each of the cavities 412 of the rubber pad 410. A maximum outer diameter A2 of the abutting portion 431 of each of the fasteners 430 is greater than a hole diameter D2 of each of the holes 421. Furthermore, the insert element 420 can further include at least two grooves 422. Each of the grooves 422 is located between the insert element 420 and the rubber pad 410, and corresponding to each of the holes 421 for accommodating the abutting portion 431 of each of the fasteners 430. Then, each of the fasteners 430 can be directly passed through and disposed in each of the holes 421, and the abutting portion 431 can be accommodated in each of the grooves 422 to abut the insert element 420 to provide a firm mounting and support. Furthermore, an outer wall 435 of each of the fasteners 430 has an embossing for generating the frictional force to increase the joint strength between each of the fasteners 430 and each of the holes 421. As known in FIG. 6 and FIG. 7, the number of each of the projection 411 and the insert element 420 is two, and the number of each of the cavity 412, the hole 421 and the groove 422 is four. The number of the above elements is not limited to the disclosure.

The insert element 420 is made of a metal material and has a certain rigidity to increase the strength of the insert element structure of the track rubber pad 400. Furthermore, each of the holes 421 of the insert element 420 is penetrated by the fastener 430, so that the screw member 210 can be locked to the threaded portion 433 of the fastener 430. Wherein, an inner diameter of the opening portion 432 of the fastener 430 is not limited to the disclosure, and the fastener 430 of different inner diameters can be provided with the screw member of different specification. Therefore, the insert element 420 of the same specification can be cooperated with the screw member 210 of different specification to connect with the track shoe plate 300 to reduce the manufacturing cost, so as to facilitate for mass production.

According to the aforementioned embodiments, the present disclosure has the advantages described bellowing.

First, by the detachable connection of the track shoe pad assembly and the insert element structure of the track rubber pad, the track shoe plate and the insert element structure of the track rubber pad are connected with each other. When the rubber pad is replaced, it is not necessary to replace the track shoe plate together to reduce the replacement cost.

Second, by the metal insert element, the intensity and the support stability of the insert element structure of the track rubber pad can be improved so as to prevent the rubber pad from swaying laterally during the operation to increase the loss.

Third, by the setting of the fastener, the screw member can be locked to the fastener instead of the hole of the insert element, so that the insert element of the same specification can be cooperated with the screw member of different specification to connect with the track shoe plate to reduce the manufacturing cost of the insert element and can facilitate for mass production.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An insert element structure of a track rubber pad, which is connected to a track shoe plate of a caterpillar vehicle by at least one screw member, the insert element structure of the track rubber pad comprising:
    a rubber pad detachably connected to the track shoe plate, one side of the rubber pad comprising at least one projection, and each of two ends of the at least one projection comprising a cavity;
    at least one insert element, each of two ends of the at least one insert element comprising a hole, the at least one insert element cladded in the at least one projection of the rubber pad, and each of the holes of the at least one insert element coaxially disposed with each of the cavities of the at least one projection; and
    two fasteners for each of the at least one insert element, wherein each of the fasteners is passed through and disposed in one of the holes of the at least one insert element, and each of the fasteners is accommodated in the at least one insert element, each of the fasteners comprising:
        an abutting portion disposed on one side of each of the fasteners, the abutting portion located between the at least one insert element and the rubber pad, wherein the abutting portion is in direct contacted with an inner surface of the rubber pad;
        an opening portion disposed on the other side of each of the fasteners, and corresponding to each of the holes of the at least one insert element; and
        a threaded portion disposed on an inner wall of each of the fasteners for locking the at least one screw member.

2. The insert element structure of the track rubber pad of claim 1, wherein a distance is disposed between each of the holes of the at least one insert element and each of the cavities of the rubber pad.

3. The insert element structure of the track rubber pad of claim 1, wherein a maximum outer diameter of the abutting portion of each of the fasteners is greater than a hole diameter of each of the holes of the at least one insert element.

4. The insert element structure of the track rubber pad of claim 1, wherein the at least one insert element further comprises two grooves, each of the two grooves is located between the at least one insert element and the rubber pad, and corresponding to each of the holes of the at least one insert element for accommodating the abutting portion of each of the fasteners.

5. The insert element structure of the track rubber pad of claim 1, wherein an outer wall of each of the fasteners has an embossing.

6. A track shoe pad assembly, which is locked and connected to a track chain of a caterpillar vehicle, and the track shoe pad assembly comprising:
    a track shoe plate configured to lock and connect to the track chain, wherein the track shoe plate comprises at least one notch and at least two first through holes, each of the at least two first through holes is passed through and disposed on the at least one notch; and
    an insert element structure of a track rubber pad connected with the track shoe plate, and comprising:
        a rubber pad detachably connected to the track shoe plate, one side of the rubber pad comprising at least one projection, the at least one projection correspondingly embedded in the at least one notch of the track shoe plate, and each of two ends of the at least one projection comprising a cavity;
        at least one insert element, each of two ends of the at least one insert element comprising a hole, the at least one insert element cladded in the at least one projection of the rubber pad, and each of the holes of the at least one insert element coaxially disposed with each of the cavities of the at least one projection, and corresponding to each of the at least two first through holes; and
        two fasteners for each of the at least one insert element, wherein each of the fasteners is passed through and disposed in one of the holes of the at least one insert element, and each of the fasteners is accommodated in the at least one insert element, each of the fasteners comprising:
            an abutting portion disposed on one side of each of the fasteners, the abutting portion located between the at least one insert element and the rubber pad, wherein the abutting portion is in direct contacted with an inner surface of the rubber pad;
            an opening portion disposed on the other side of each of the fasteners, and corresponding to each of the holes of the at least one insert element; and
            a threaded portion disposed on an inner wall of each of the fasteners.

7. The track shoe pad assembly of claim 6, wherein a number of the at least one notch is two.

8. The track shoe pad assembly of claim 6, further comprising at least two screw members, each of the at least two screw members correspondingly passed through each of the at least two first through holes and locked to the threaded portion of each of the fasteners.

9. The track shoe pad assembly of claim 6, wherein the track shoe plate further comprises at least one second through hole, and the at least one second through hole is passed through and disposed in the at least one notch.

10. The track shoe pad assembly of claim 9, further comprising at least one connecting member, the at least one connecting member correspondingly passed through the at least one second through hole and configured to connect to the track chain.

11. The track shoe pad assembly of claim 10, wherein the rubber pad further comprises at least one recess, the at least one recess is configured to contain the at least one connecting member of the at least one second through hole correspondingly.

12. The track shoe pad assembly of claim 6, wherein a distance is disposed between each of the holes of the at least one insert element and each of the cavities of the rubber pad.

13. The track shoe pad assembly of claim 6, wherein a maximum outer diameter of the abutting portion of each of the fasteners is greater than a hole diameter of each of the holes of the at least one insert element.

14. The track shoe pad assembly of claim 6, wherein the at least one insert element further comprises two grooves, each of the two grooves is located between the at least one insert element and the rubber pad, and corresponding to each of the holes of the at least one insert element for accommodating the abutting portion of each of the fasteners.

15. The track shoe pad assembly of claim 6, wherein an outer wall of each of the fasteners has an embossing.

16. The track shoe pad assembly of claim 10, wherein the at least one connecting member is a screw stem.

17. The insert element structure of the track rubber pad of claim 3, wherein for each of the fasteners:

- the maximum outer diameter of the abutting portion is greater than a diameter of the opening portion;
- the one side where the abutting portion disposed is at one extreme end of each of the fasteners, and the other side where the opening portion formed is at an opposite extreme end of each of the fasteners; and
- the maximum outer diameter of the abutting portion is disposed at a part of each of the fasteners that is farthest from the corresponding hole of the at least one insert element.

* * * * *